(12) United States Patent
Sakai et al.

(10) Patent No.: US 9,830,112 B2
(45) Date of Patent: Nov. 28, 2017

(54) PRINTING SYSTEM, USER TERMINAL, PRINTER, USER TERMINAL CONTROL PROGRAM, AND PRINTING METHOD

(71) Applicant: SEIKO EPSON CORPORATION, Tokyo (JP)

(72) Inventors: Mamoru Sakai, Kanagawa (JP); Shoichi Nakajo, Nagano (JP); Fuminori Hanaoka, Nagano (JP); Kazuya Yoshikaie, Fukuoka (JP); Katsuhiko Nishizaka, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 4 days.

(21) Appl. No.: 14/157,062

(22) Filed: Jan. 16, 2014

(65) Prior Publication Data

US 2014/0204415 A1   Jul. 24, 2014

(30) Foreign Application Priority Data

Jan. 24, 2013   (JP) ................................. 2013-010927

(51) Int. Cl.
 G06F 3/12   (2006.01)
(52) U.S. Cl.
 CPC ............ *G06F 3/1204* (2013.01); *G06F 3/126* (2013.01); *G06F 3/1288* (2013.01); *G06F 3/1292* (2013.01)
(58) Field of Classification Search
 None
 See application file for complete search history.

(56) References Cited

U.S. PATENT DOCUMENTS

| 8,050,983 B1* | 11/2011 | Eakin .................... G06Q 10/10 235/379 |
| 2005/0138353 A1* | 6/2005 | Spies .................. H04L 63/0442 713/153 |
| 2005/0270569 A1 | 12/2005 | Hayashi |
| 2008/0174805 A1* | 7/2008 | Wang ................. H04N 1/00244 358/1.15 |
| 2012/0194864 A1 | 8/2012 | Oshima et al. |
| 2012/0307298 A1* | 12/2012 | Ishige et al. ................. 358/1.15 |
| 2013/0003120 A1 | 1/2013 | Watariuchi |
| 2013/0094047 A1* | 4/2013 | Bailey et al. ................ 358/1.14 |
| 2014/0085663 A1* | 3/2014 | Kavanappillil .... H04N 1/00342 358/1.15 |

FOREIGN PATENT DOCUMENTS

| JP | 2005-352584 A | 12/2005 |
| JP | 2012-159914 A | 8/2012 |
| JP | 2012-252455 A | 12/2012 |
| JP | 2013-011954 A | 1/2013 |

\* cited by examiner

*Primary Examiner* — Marivelisse Santiago Cordero
*Assistant Examiner* — Lennin Rodriguezgonzalez
(74) *Attorney, Agent, or Firm* — Global IP Counselors, LLP

(57) ABSTRACT

To reduce effort in an operation where an email address which is assigned to a printer is set as the destination of an email in a user terminal, a printing system which performs printing based on an email which is transmitted by a user terminal and which includes a printer which has a recording medium which records information which indicates an email address which is assigned to the printer and provides the email address to the user terminal by means of contactless communication, and a printing control means which executes printing based on printing data which corresponds to an email which is transmitted with the email address set as the destination.

7 Claims, 5 Drawing Sheets

PRINTING SYSTEM, USER TERMINAL, PRINTER, USER TERMINAL CONTROL PROGRAM, AND PRINTING METHOD

CROSS-REFERENCE TO RELATED APPLICATIONS

This application claims priority to Japanese Patent Application No. 2013-010927 filed on Jan. 24, 2013. The entire disclosure of Japanese Patent Application No. 2013-010927 is hereby incorporated herein by reference.

BACKGROUND

Technical Field

The present invention relates to a printing system, a user terminal, a printer, a user terminal control program, and a printing method.

Background Technology

A printing system is known which is provided with a function where an email is received and the body of an email and attached files are printed (for example, Patent Document 1). For example, such a printing system is provided with a server which generates printing data which corresponds to a specific printer based on the body of an email and attached files when an email with an email address, which is assigned to a printer which a user wishes to use, is received, and a printer which acquires the printing data and executes printing. Accordingly, it is possible for the user of the printing system to use the printer even in a case where a printer driver program is not installed in each user terminal such as a PC or a smart phone.

Japanese Laid-open Patent Publication No. 2012-159914 (Patent Document 1) is an example of the related art.

SUMMARY

Problems to be Solved by the Invention

For example, it is possible to consider a service where printers are lent out to guests in hotels or the like. In the service, an email address is temporarily assigned to the printer each time the printer is lent out. The reason for the email address being temporarily assigned is to prevent junk emails and the use of the printer other than by the guests during the lending (for example, a user who previously used the printer). In order to prevent nuisances or fraudulent use by a third party in this manner, it is desirable that the email address which is temporarily assigned to the printer be set to include a complex character string with a large number of characters which are not able to be easily guessed by a third party. However, it is considered that an operation where an authorized user inputs an email address, which is complex with a large number of characters as the destination, into a terminal, such as a smart phone of the user, takes a large amount of effort. The invention was carried out in view of the problems described above and has an advantage of reducing the effort in an operation of setting an email address which is assigned to a printer in a user terminal as the destination of an email.

Means Used to Solve the Above-Mentioned Problems

A printing system for achieving the advantage described above which performs printing based on an email which is transmitted by a user terminal and includes a printer which has a recording medium and a printing control means. The recording medium of the printer records information which indicates an email address which is assigned to the printer and provides the email address to the user terminal by means of contactless communication. The printing control means of the printer executes printing based on the printing data which corresponds to an email which is transmitted with the email address set as the destination.

By the printer having a recording medium which records information which indicates the email address which is assigned to the printer and provides the email address to the user terminal by means of contactless communication, it is possible for the user of the user terminal to easily input the email address of the printer into the user terminal by means of contactless communication. Accordingly, it is possible to reduce the effort required for the user to input the email address compared with a case where the user of the user terminal manually inputs the email address one character at a time. In addition, by an email being transmitted to the email address of the printer which is acquired from the recording medium, it is possible for the user of the user terminal to print the printing data which corresponds to the email using the printer.

Here, it is sufficient if the recording medium corresponds one to one with the printer, but the recording medium may be provided to be integral with the housing of the printer, may be separate from the printer, or may be provided to be able to be freely attached to and detached from the printer. In addition, the printing data which corresponds to the email has the meaning of data where the attached files which are attached to the email, the email body, and the like are converted into a format which is appropriate for printing in the printer. The printing data may be generated by the user terminal, may be generated by the printer itself, or may be generated by an apparatus which is different to the user terminal or the printer.

Furthermore, the printing system for achieving the advantage described above may further be provided with a server which has a printing data generating means and a printing data transmitting means. The printing data generating means generates printing data based on an email which is transmitted from the user terminal with the email address as the destination. The printing data transmitting means transmits the printing data which is generated to the printer. In addition, in this case, the printing control means of the printer executes printing based on the printing data which is transmitted from the server. In a case of a configuration which generates printing data in the server in a format where it is possible for the printer to execute printing and the printing data after generation is transmitted to the printer, it is not necessary to install a driver program for the printer in the user terminal. Accordingly, it is convenient for the user since the user need not expressly install a driver program for the printer and it is possible to save resources for memory in the user terminal. In addition, it is not necessary for the printer in the case of the present configuration to, for example, have a function where various types of files which are able to be attached to an email which is transmitted from the user terminal are converted into printing data. As a result, it is possible to, for example, save resources for memory or the like of the printer and it is possible to reduce the cost of the printer.

Furthermore, in the printing system for achieving the advantage described above, a period of validity is stipulated in the email address. Then, the printing control means of the printer executes printing based on the printing data which corresponds to an email which is transmitted to the email address which corresponds to the printer within the period of validity. In other words, the printing control means of the printer does not execute printing based on the printing data which corresponds to the email of the email address where the period of validity has been exceeded. Accordingly, it is possible to prevent fraudulent use of the printer since printing which corresponds to the email is not executed in the printer even when an email is transmitted from the user terminal to the email address where the period of validity has been exceeded.

Here, determination of whether or not to execute printing according to the period of validity of the email address may be performed by the printer itself or may be performed by an apparatus which is different to the printer. For example, the printer may be set not to execute the printing by the printing data which corresponds to the email of the email address, where the period of validity has been exceeded, not being transmitted from the printing data transmitting means in the server described above to the printer. In addition, it is sufficient if the period of validity which is stipulated in the email address is information which directly or indirectly indicates a limit up to which it is possible to use the present printing system by transmitting an email to the email address, but it is possible to adopt various formats. For example, the period of validity may be stipulated directly using a date and time. In addition, for example, the period of validity may be indicated by the number of times of printing or the number of printed sheets. In more detail, for example, it may be set to permit printing only one time (where the number of times of printing is one) (the period of validity finishes after printing is performed one time), to permit printing within a predetermined number of printed sheets which is determined in advance (the period of validity finishes after the predetermined number of printed sheets is reached), or the like.

Furthermore, in the printing system for achieving the advantage described above, the recording medium may be a NFC (Near Field Communication) tag. With a passive NFC tag, it is possible to easily rewrite the data (the email address) which is recorded in the NFC tag by holding up a device which has a reader/writer function to the recording medium and it is possible to repeatedly use the NFC tags. In addition, in the case of an active NFC tag, it is possible to rewrite the data which is recorded in the tag according to an instruction from the printer by communicating with the printer and repeated use is possible. Here, the recording medium may be a printing medium or the like where a two-dimensional code or the like which indicates the email address is printed.

Furthermore, in the printing system for achieving the advantage described above, the server may have a rewriting instruction information transmitting means which transmits rewriting instruction information with regard to the email address which is recorded in the recording medium to the printer. In this case, the printer has a rewriting means which performs deleting or rewriting of the email address which is recorded in the recording medium based on the rewriting instruction information which is transmitted from the server. In this case, it is possible to automatically perform rewriting without it being necessary for, for example, a system administrator or the like to perform a rewriting operation for the data (the email address) which is recorded in the recording medium. As a result, it is possible to reduce the operational burden on the system administrator.

Furthermore, the invention is also established as an invention of a printer which performs printing based on an email which is transmitted by the user terminal and has a recording medium which records information which indicates an email address which is assigned to the printer and provides the email address to the user terminal by means of contactless communication, and a printing control means which executes printing based on printing data which corresponds to an email which is transmitted with the email address set as the destination.

Furthermore, the invention is also established as an invention of a printing method which includes acquiring an email address using a user terminal by means of contactless communication from a recording medium which is provided in a printer and which records information which indicates the email address which is assigned to the printer, setting the email address which is acquired as the destination of the email using the user terminal, transmitting the email where the email address is set as the destination using the user terminal, and executing printing using the printer based on the printing data which corresponds to the email. In addition, the above apparatus, program, and method include various aspects and may be realized as a single apparatus in some cases or may be realized by using shared components in an apparatus which has multiple functions.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
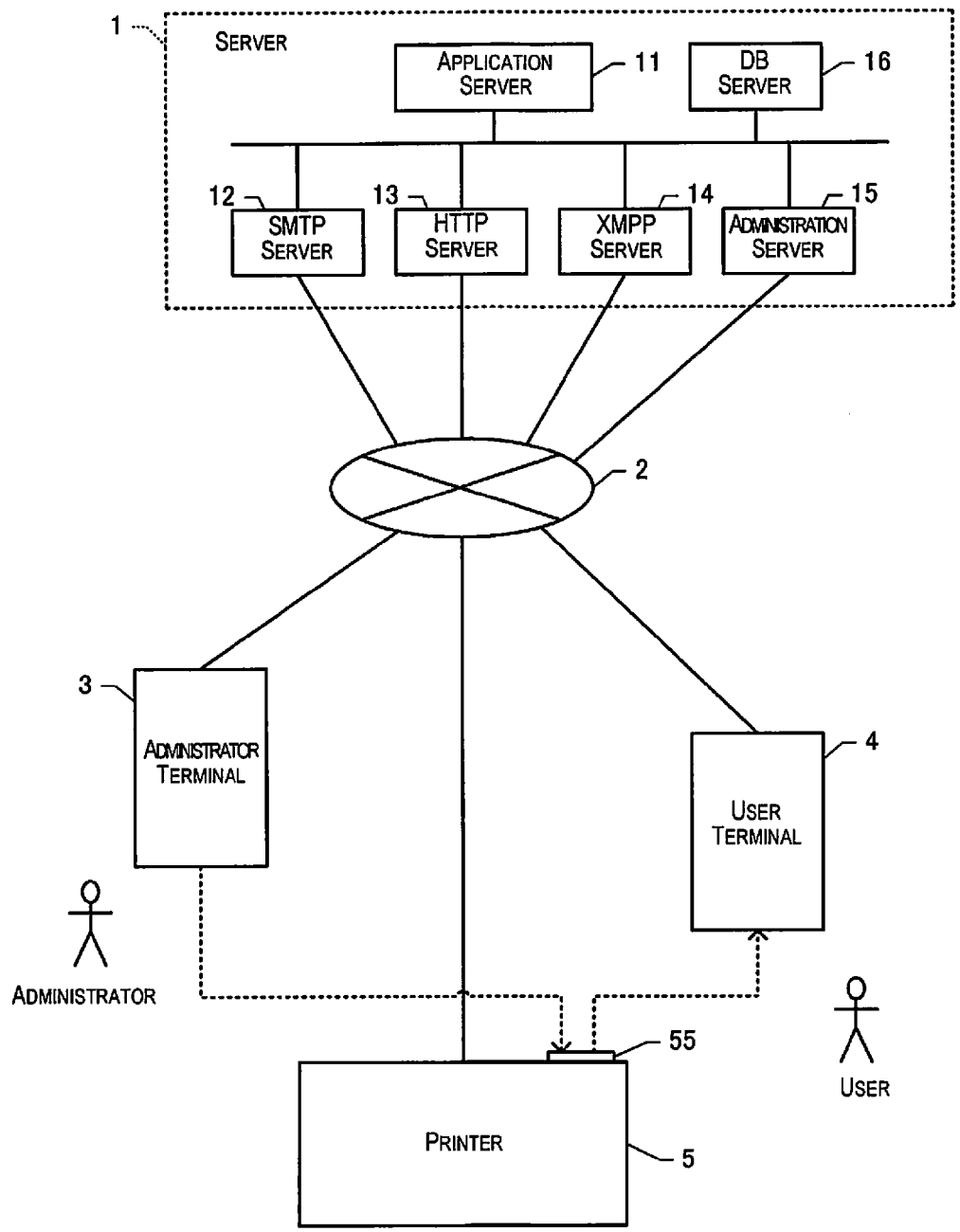
FIG. 1 is a block diagram illustrating a configuration of a printing system.

Below, embodiments of the invention will be described with reference to the attached diagrams. Here, the same reference numerals are given to corresponding constituent components in each of the drawings and duplicate description is omitted.

1. First Embodiment 1-1. Configuration of Printing System

FIG. 1 is a block diagram illustrating a configuration of a printing system according to an embodiment of the invention. A printing system 100 according to the first embodiment is provided with a server 1, an administrator terminal 3, a user terminal 4, and a printer 5. The printing system 100 is configured as a cloud computing system where it is possible to print attached files and the body of an email by the user terminal 4 transmitting an email to an email address which is assigned to the printer 5 which is registered in the server 1.

Figure 2A:
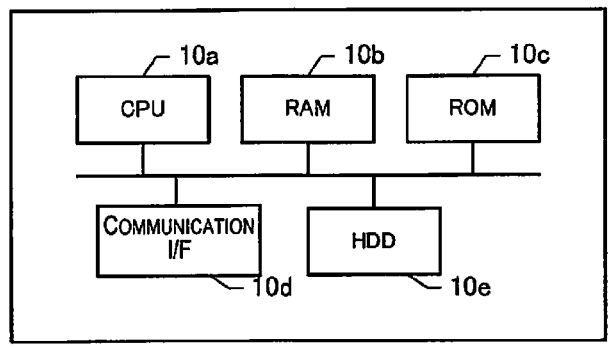
FIG. 2A is a block diagram illustrating a configuration of a server computer.

The server 1, the administrator terminal 3, the user terminal 4, and the printer 5 are connected with the Internet 2. The server 1 is configured by one or more computers and includes, for example, an application server 11, an SMTP server 12, an HTTP server 13, an XMPP server 14, an administration server 15, and a DB server 16. Each of the application server 11, the SMTP server 12, the HTTP server 13, the XMPP server 14, the administration server 15, and the DB server 16 is a computer which is provided with a CPU 10a, a RAM 10b, a ROM 10c, a communication I/F 10d, a hard disk apparatus (HDD) 10e, and the like as shown in FIG. 2A, and it is possible for each of the servers to communicate with each other via a LAN or the like. It is possible for each of the servers which are provided in the server 1 to execute programs which are recorded in the ROM 10c or the HDD 10e by loading the programs into the RAM 10b and executing the programs with the CPU 10a. The programs include programs for realizing communication according to various types of communication protocol and programs for realizing various functions which will be described later. The communication I/F 10d transmits a signal to an internal bus by converting the signal, which is received from the Internet 2 through a LAN, according to a protocol and transmits a signal to the Internet 2 through the LAN by converting the signal, which is taken in from the internal bus, according to a protocol.

The administration server 15 communicates with the administrator terminal 3 which is used by the administrator based on HTTP (Hyper Text Transfer Protocol) or the like and has a function where various settings inside the server 1 which relate to the printer 5 are entered by the administrator. In detail, the administration server 15 opens a website for the administrator for the administrator to enter requests to create a new email address for the printer 5, settings for the period of validity, and the like, and the various settings from the administrator are entered and reflected in the DB server 16 which will be described later. The DB server 16 has a function where information is stored for each of the printers. In detail, for example, the DB server 16 stores the identification information of the printers for each of the printers to correspond with the email address which is currently assigned, the period of validity of the email address which is currently assigned, the email addresses which were assigned in the past, and the like, and performs referencing and rewriting of the data according to instructions from each of the servers of the server 1.

The SMTP server 12 has a function where emails to the email addresses which are assigned to each of the printers (for example, the printer 5) which are registered in the DB server 16 are sent and received based on SMTP (Simple Mail Transfer Protocol). The XMPP server 14 has a function where communication is carried out with the printer 5 based on XMPP (Extensible Messaging and Presence Protocol). The HTTP server 13 has a function where communication is carried out with the printer 5 based on HTTP (Hyper Text Transfer Protocol) and transmits printing data to the printer 5 according to a printing data transmission command from the printer 5.

The application server 11 has a function where printing is executed by instructing the printer 5, which corresponds to the email address which is set as the destination of the email, to print when an email is received based on SMTP. In detail, the application server 11 has a function where printing data is generated based on an email, notification that there is a print job is transmitted to the printer 5 based on XMPP, and the printing data which is generated is transmitted to the printer 5 according to a transmission command based on HTTP from the printer 5. The application server 11 functions as a "printing data generating means". In addition, the application server 11, the HTTP server 13, and the XMPP server 14 function as a "printing data transmitting means".

Figure 2B:
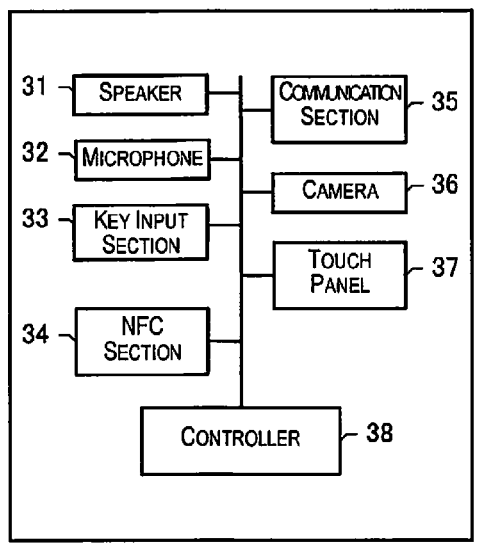
FIG. 2B is a block diagram illustrating a configuration of an administrator terminal and a user terminal.

The administrator terminal 3 and the user terminal 4 are apparatuses which have a communication function such as a smart phone, a tablet terminal, or the like. As shown in FIG. 2B, the administrator terminal 3 and the user terminal 4 are provided with a controller 38, a speaker 31 which generates sound, a microphone 32 which captures sound, a key input section 33, an NFC (Near Field Communication) section 34, a communication section 35, a camera 36, a touch panel 37, and the like. The controller 38 is formed of a CPU, a RAM, a ROM, a non-volatile memory, and the like and it is possible for the CPU to execute various types of programs which are recorded in the ROM and the non-volatile memory. The various types of programs include an email sending and receiving program for sending and receiving emails, programs for controlling a writing operation and a reading operation for the information with regard to the NFC tag (a reader program and a writer program), and the like. In addition, the various types of programs include communication programs for realizing communication such as HTTP, TCP/IP, SMTP, POP, and IMAP.

The communication section 35 is provided with a wireless LAN communication interface for connecting with the Internet 2. In addition, the communication section 35 is provided with an interface for audio communication by being connected with a telephone line network. The camera 36 is provided with a lens, an area image sensor, and an image processing circuit, and captures a subject and generates digital image data. The NFC section 34 is provided with a reader/writer interface for performing reading, writing, and deleting of the data which is recorded in an NFC tag 55 by means of contactless communication with the NFC tag 55.

Figure 2C:
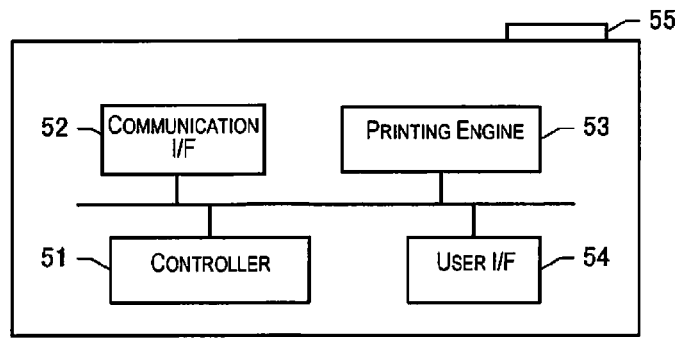
FIG. 2C is a block diagram illustrating a configuration of a printer.

The printer 5 has a function where printing data is received from the server 1 using HTTP and printing is executed based on the printing data which is received when notification that there is a printing job is received from the server 1 according to a constant connection with the server 1 using XMPP. As shown in FIG. 2C, the printer 5 is provided with a controller 51, a communication I/F 52, a printing engine 53, a user I/F 54, and the NFC tag 55 (which is equivalent to the "recording medium"). The controller 51 is formed of a CPU, a non-volatile memory, a RAM, an ASIC, and the like and it is possible to realize the functions of the printer 5 by the CPU executing the various types of programs such as communication programs and printing programs which are recorded in the non-volatile memory.

The communication program is a program for performing communication with the server 1 according to a communication protocol such as TCP/IP, HTTP, or XMPP. Here, contact information (JID, password, or the like) which is necessary in order to connect with the server 1 using HTTP and XMPP is acquired in advance by the printer 5 and stored in the non-volatile memory. The printer 5 is always connected with the XMPP server 14 using XMPP based on the connection information in a state where the power is on, and it is always possible to receive notifications from the XMPP server 14. By executing the communication program, it is possible for the printer 5 to receive a notification that there is a print job from the XMPP server 14 using XMPP, and it is possible to send a command for the transmission of printing data from the HTTP server 13 and receive the printing data from the HTTP server 13 using HTTP. The URL of the HTTP server 13 which is the acquisition destination of the printing data is notified to the printer 5 in, for example, the notification that there is a printing job.

The printing program is a program for executing printing based on the printing data which is received when the printing data is received from the HTTP server 13. In more detail, the printing program is a program which has a function where the printing data is converted into data with an appropriate format for printing in the printer 5 by carrying out a printing pre-process with regard to the printing data which is received and performing printing by controlling the printing engine 53 based on the data after conversion. The controller 51 which executes the printing program is equivalent to the "printing control means".

For example, the server 1 generates printing data in a format which is able to be interpreted by the printer 5 by rendering the attached files (the email body may also be included as the printing target) in the email for the email address which is assigned to the printer 5, and transmits the data to the printer 5. Then, by executing the printing program, the printer 5 carries out processes such as a resolution conversion process, a color conversion process, a halftone process, and a sorting process as printing pre-processes with regard to the printing data which is acquired from the server 1. The printing engine 53 is provided with an actuator, a sensor, a driving circuit, and mechanical parts for executing printing onto a printing medium such as photographic paper, plain paper, or an OHP sheet with a well-known printing system such as an ink jet system or an electro-photographic system.

The communication I/F 52 includes a wireless LAN communication interface or a wired LAN communication interface for connecting the server 1 and the administrator terminal 3 via the Internet 2. The user I/F 54 is an operation panel which is configured by a touch panel display, operation keys, or the like. The NFC tag 55 is an apparatus which is provided with a minute IC chip, an antenna, and the like and is able to electrically read and write data into the non-volatile memory inside the IC chip by obtaining electric power by electromagnetic induction. The NFC tag 55 is a passive tag in the present embodiment and it is possible to perform reading, rewriting, deletion, and the like of the data which is recorded in the NFC tag 55 by holding up a device which has an NFC reader/writer function to the NFC tag 55. The NFC tag 55 in the present embodiment is sealed and is affixed to the outside of the housing of the printer 5.

Here, for example, a service of lending out the printer 5 with regard to guests making such a request at a hotel is assumed in the present embodiment. Accordingly, the printer 5 is assumed to be a mobile printer which is easy to carry.

1-2. Preparation Sequence Prior to Printer Lending and Printing Sequence

Figure 3:
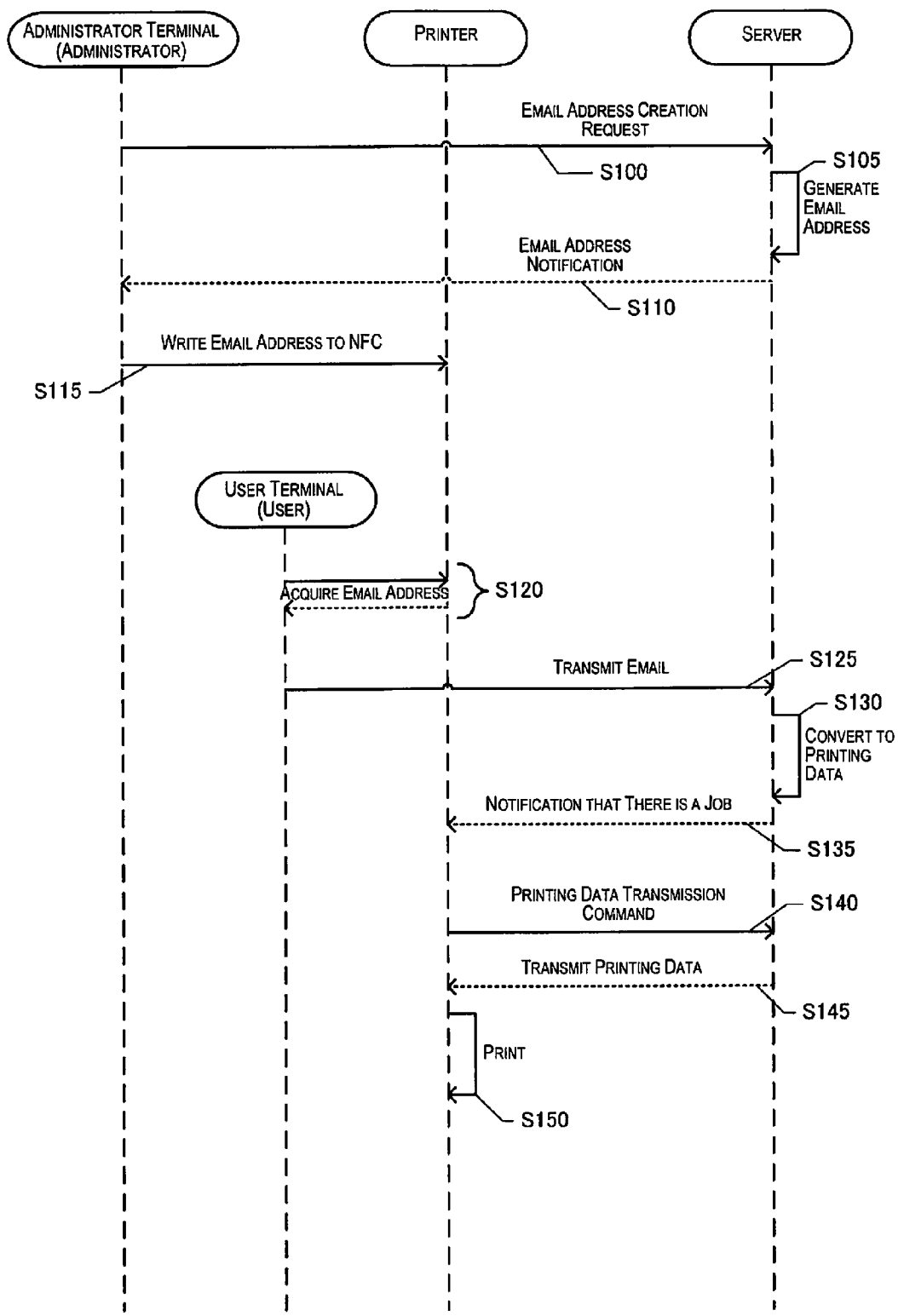
FIG. 3 is a sequence chart illustrating a preparation sequence prior to lending out a printer and a printing sequence.

FIG. 3 is a sequence chart illustrating a preparation sequence prior to lending out a printer and a printing sequence. When there is a request to lend out the printer 5 from a guest (referred to below as a user), the system administrator of the hotel (referred to below simply as the administrator) makes a request to create an email address (with a period of validity), which is newly assigned to the printer 5, with regard to the server 1 using the administrator terminal 3 (step S100). In detail, for example, an administration page is provided in the administration server 15 of the server 1 for each of the printers which is registered in the DB server 16, and the administrator accesses the administration page of the printer 5 using a web browser of the administrator terminal 3 and requests the creation of a new email address for the printer 5. It is possible for the administrator to specify the printer 5 from among the other printers which are registered in the DB server 16 according to the identification information which is able to uniquely specify the printer 5 such as the MAC address or the serial number of the printer 5. For example, in the new email creation request page (the administration page) of the printer 5, an input column for the period of validity of the email address which is to be newly created and a "request" button are prepared, and the administrator inputs the period of validity of the email address in the input column for the period of validity and presses the "request" button. For example, the administrator sets the check-out schedule date and time and the like of the user as the period of validity of the email address.

When a request to create an email address is received, the server 1 generates an email address with a period of validity which corresponds to the identification information of the printer 5 (step S105) and notifies the administrator terminal 3 of the email address which is generated (step S110). In detail, the administration server 15 generates an email address with a new character string which corresponds uniquely to the identification information of the printer 5 and which was not issued in the past by referring to the DB server 16 and, for example, provides the email address on the new email creation request page. The administrator terminal 3 acquires the display data for this page and displays the display data on the web browser of the administrator terminal 3. In addition, the administration server 15 updates the email address which is currently assigned to the printer 5 in the DB server 16, the period of validity information, and the content of the email addresses which were assigned in the past based on the information of the newly created email address of the printer 5 and the period of validity.

The administrator holds up the administrator terminal 3 to the NFC tag 55 which is affixed to the printer 5 and the email address which was notified from the server 1 is written in (step S115). In detail, for example, in a state where the administrator holds up the administrator terminal 3 to the NFC tag 55, the newly assigned email address of the printer 5 which is displayed on the web browser of the administrator terminal 3 in step S110 is written into the NFC tag 55 by executing the writer program. In a case where the old email address is already recorded in the NFC tag 55, the old email address is deleted and rewritten to the new email address.

The preparation sequence finishes prior to lending out in steps S100 to S115. After the preparation sequence finishes, the administrator lends out the printer 5 to the user. The printer 5 which is lent out completes a connection with a wireless LAN router in the hotel and is able to communicate with the server 1 via the Internet 2. The printing sequence in steps S120 to S150 will be described. Firstly, the user acquires the email address which is assigned to the printer 5 from the NFC tag 55 by holding up the user terminal 4 to the NFC tag 55 which is affixed to the printer 5 which is lent out (step S120). In detail, it is possible to acquire the email address which is recorded in the NFC tag 55, by executing the reader program in the user terminal 4 in a state where the user terminal 4 is held up to the NFC tag 55.

The user operates the touch panel 37 or the key input section 33 of the user terminal 4, creates a new email with the email address which is acquired in step S120, and transmits an email with the print target file attached as an attached file (step S125). The reader program has a function where data is read out from the NFC tag and an operation is performed according to the type of data which is read out. In more detail, for example, the reader program determines that the data which is read out is an email address in a case where "@" is included in the data which is read out and has a function where the email sending and receiving program is activated. As a result, when the controller 38 acquires data from the NFC tag 55 by executing the reader program, the email sending and receiving program is activated in a state where the email address which is acquired from the NFC tag 55 is set as the destination of the newly created email. When the user attaches a printing target file to the newly created email in a state where the email address is set and presses the transmit button, the email sending and receiving program performs transmitting of the newly created email.

In the present embodiment as described above, it is not necessary for the user to manually input the email address one character at a time when creating an email with the email address which is assigned to the printer 5. As a result, it is possible to reduce the effort of the user in an email address setting operation.

When the email is received, the server 1 converts the attached file into printing data in a format which is appropriate for printing in the printer 5 (step S130) and transmits notification that there is a job to the printer 5 (step S135). In detail, when the SMTP server 12 receives the email, the application server 11 determines that the email address which is the destination of the email is an address which corresponds to any of the printers which are registered in the DB server 16 and whether the address is within the period of validity. When it is determined that the email address which is the destination is an address which corresponds to any of the printers which are registered in the DB server 16 and an address which is within the period of validity, the application server 11 generates printing data by rendering the attached file of the email. Then, the application server 11 transmits notification that there is a job using XMPP from the XMPP server 14 to the printer 5, which corresponds to the email address which is set as the destination of the email which is received.

When the notification that there is a job is received from the server 1, the printer 5 commands the transmission of the printing data (step S140), and the server 1 transmits the printing data to the printer 5 according to the printing data transmission command from the printer 5 (step S145). In detail, when the notification that there is a job is received, the printer 5 commands the transmission of the printing data from the HTTP server 13 using HTTP. Information such as the URL for commanding the transmission of the printing data is, for example, included in the notification that there is a job. The printer 5 receives the printing data from the HTTP server 13 using HTTP. When the printing data is received, the printer 5 executes printing based on the printing data (step S150). In detail, printing pre-processes are carried out with regard to the printing data, and printing is executed by driving the printing engine 53 based on the data which is generated as a result.

Here, after the period of validity has passed, since the notification that there is a job is not transmitted from the server 1 to the printer 5 even when the email with the attached file is transmitted to the email address which is acquired from the NFC tag 55, the printing data is not transmitted to the printer 5 and the printing is not performed in the printer 5. As a result, it is possible to prevent fraudulent use of the printer 5. In addition, since there is a configuration in the present embodiment where printing data is generated in the server 1 in a format where it is possible for the printer 5 to execute printing and the printing data is transmitted to the printer 5 after generation, it is not necessary to install driver programs for the printer 5 in the user terminal 4. As a result, it is convenient for the user and it is possible to save resources for memory in the user terminal 4. In addition, it is not necessary for the printer 5 to have a function where various types of files which are able to be attached to the email which is transmitted from the user terminal 4 are converted into printing data. As a result, it is possible to save resources for memory and the like in the printer 5 and it is possible to reduce the cost of the printer 5.

2. Second Embodiment

Figure 4:
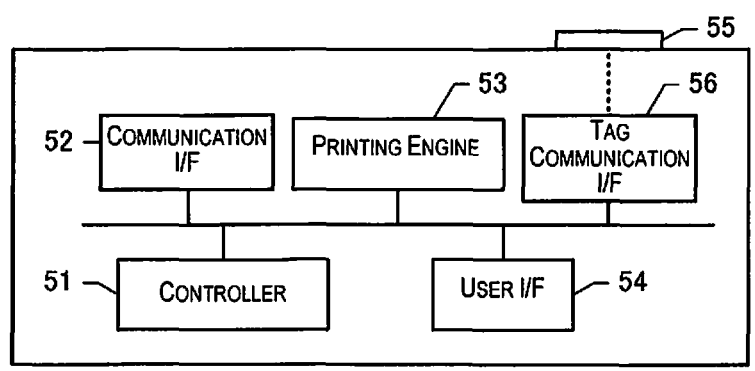
FIG. 4 is a block diagram illustrating a configuration of a printer according to a second embodiment.

Features where a second embodiment is different to the first embodiment are a feature where the NFC tag which is affixed to the printer 5 is an active tag and a feature where the printer 5 performs rewriting of the data to the NFC tag 55. FIG. 4 is a block diagram illustrating the configuration of the printer 5 according to the second embodiment. The printer 5 according to the second embodiment is further provided with a tag communication I/F 56 (which is equivalent to the "rewriting means") for communicating with the active NFC tag 55. Since the configuration in other respects is shared with the first embodiment, description thereof will be omitted.

Figure 5A:
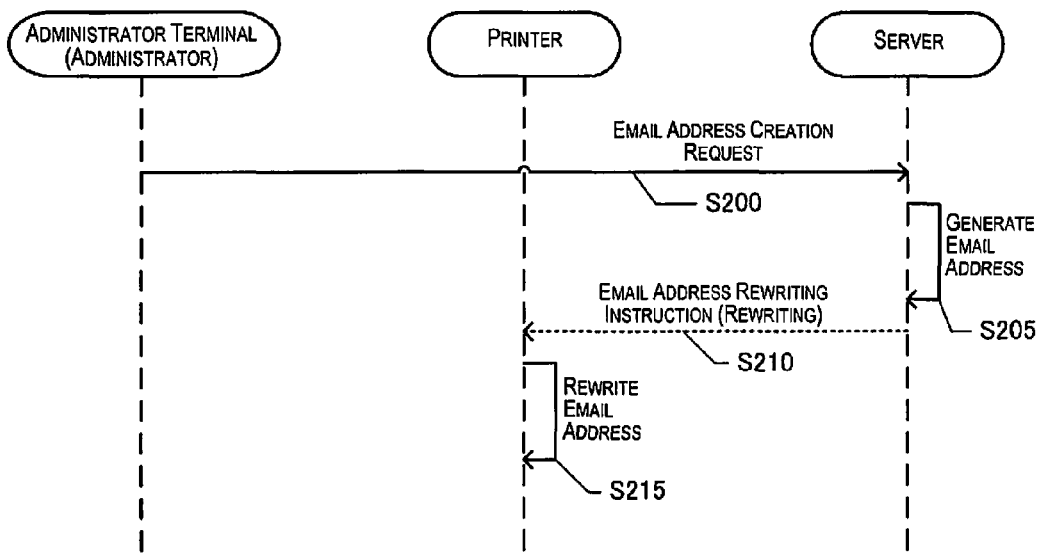
FIGS. 5A and 5B are sequence charts according to the second embodiment.

FIG. 5A is a sequence chart illustrating email address settings in the NFC tag 55 according to the second embodiment. When the administrator performs an email address creation request with regard to the server 1 in the same manner as step S100 in FIG. 3 in the first embodiment (step S200) and the server 1 generates the email address of the printer 5 in the same manner as step S105 (step S205), the server 1 transmits rewriting instruction information for the created email address to the printer 5 (step S210).

In detail, for example, the XMPP server 14 notifies the printer 5 of the new email address using XMPP. In this case, the XMPP server 14 functions as a "rewriting instruction information transmitting means". The controller 51 of the printer 5 controls the tag communication I/F 56 and rewrites the email address which is written into the NFC tag 55 with the email address which is newly notified from the server 1 in step S210 (step S215). As a result, in the second embodiment, it is possible to eliminate the effort for rewriting the email address by the administrator holding up the administrator terminal 3 to the NFC tag 55 as described in the first embodiment.

Figure 5B:
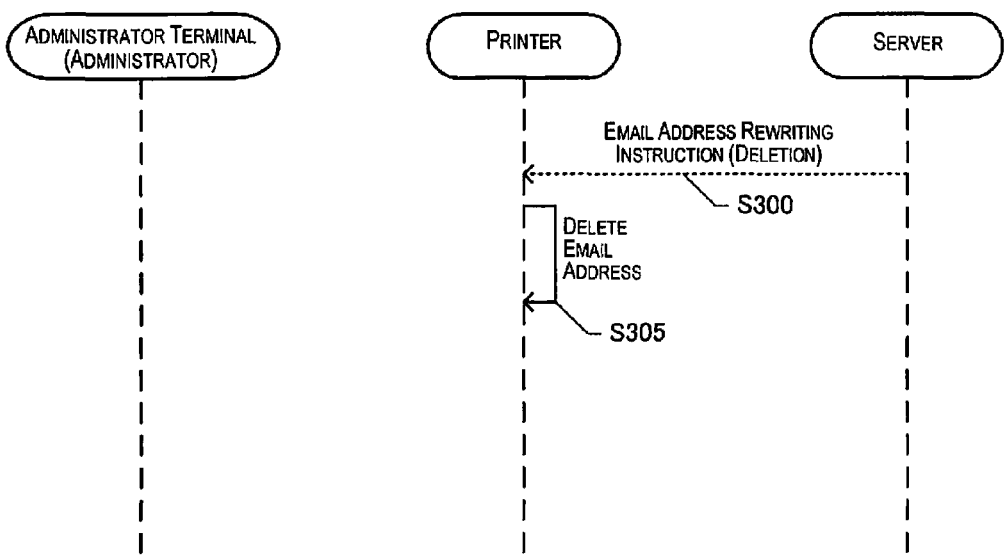

FIG. 5B is a sequence chart according to the second embodiment illustrating an example of address deletion inside the NFC tag 55 in a case where the period of validity of the email address is expired. When the period of validity of the email address has been exceeded, the server 1 transmits rewriting instruction information (a deletion instruction) for the email address to the printer 5 (step S300) and the printer 5 deletes the email address which is recorded in the NFC tag 55 when the rewriting instruction information (the deletion instruction) is received (step S305) as shown in FIG. 5B. In detail, for example, the XMPP server 14 notifies the printer 5 of the rewriting instruction information (the deletion instruction) using XMPP. Even in this case, the XMPP server 14 functions as a "rewriting instruction information transmitting means". The controller 51 of the printer 5 controls the tag communication I/F 56 and deletes the email address which is written into the NFC tag 55. As a result, the effort of deleting the email address is eliminated by the administrator holding up the administrator terminal 3 to the NFC tag 55. In addition, after the period of validity has passed, it is possible for the email address not to be able to be acquired even when the user holds up the user terminal 4 to the NFC tag 55 (since the email address is already deleted in the NFC tag 55).

3. Other Embodiments

Here, the technical scope of the invention is not limited to the embodiments described above and it is clear that it is possible to add various types of modifications within a scope which does not depart from the gist of the invention. For example, in the embodiments described above, the server 1 is responsible for the step of generating printing data from the attached file of the email to the email address which is assigned to the printer 5, but the step may be performed by the printer 5 itself. That is, the printer 5 may be configured to receive an email addressed to itself from an email server and to execute printing by opening the attached file of the email and converting the file into data in a format which is appropriate for printing in the printer 5 by itself.

In addition, in the embodiments described above, an example is given where an NFC tag is adopted as the "recording medium", but a configuration may be adopted where the email address is acquired by, for example, creating a two-dimensional code (for example, a QR code: a registered trademark of Denso Wave Inc.) which indicates the email address in the printer 5, printing the code onto a printing medium, and the user reading the two-dimensional code from the printing medium using the user terminal. In this case, the "recording medium" is equivalent to the printing medium where the two-dimensional code is printed. That is, "contactless communication" also includes reading the two-dimensional code in this manner. As a configuration may be adopted where the two-dimensional code which indicates the email address is displayed on a liquid crystal panel in the printer 5 and the email address is acquired by the user terminal reading the two-dimensional code.

What is claimed is:

1. A printing system which performs printing based on an email transmitted from a user terminal, the printing system comprising:
   a server having
      a managing section which receives a request for generating an email address, together with a period of validity of the email address, and generates the email address, which is temporarily assigned to the printer, and information on the period of validity, the period of the validity of the email address being set individually for each user as the generating of the email address is requested,
      a receiving section which receives an email which is transmitted from the user terminal with the email address being set as the destination,
      a printing data generating section which generates printing data based on the received email, and
      a printing data transmitting section which transmits the printing data to the printer; and
   a printer having
      a wireless tag which records information indicative of the email address temporarily assigned to the printer in advance, and transmits the email address to the user terminal by means of wireless communication, and
      a printing controller which executes printing,
   wherein the printing controller executes printing based on the printing data which is transmitted from the server,
   the server further having a rewriting instruction information transmitting section which transmits rewriting instruction information with regard to the email address which is recorded in the wireless tag to the printer, and
   the printer further having a rewriting section which deletes or rewrites the email address which is recorded in the wireless tag based on the rewriting instruction information which is transmitted from the server.

2. The printing system according to claim 1,
wherein the printing controller executes the printing based on the printing data which corresponds to the email which is transmitted to the server within the period of validity.

3. The printing system according to claim 1,
wherein the wireless tag is an NFC tag.

4. The printing system according to claim 1, wherein
the server includes a writing instruction information transmitting section which transmits writing instruction information to the printer, the writing instruction information instructing the email address which is assigned to the printer be written in the wireless tag, wherein
the printer has a writing section which writes the email address in the wireless tag based on the writing instruction information transmitted from the server.

5. The printing system according to claim 4, wherein
the server has an address generating section which generates the email address which is assigned to the printer based on instructions transmitted from an administrator terminal, and
the writing instruction information transmitting section transmits the writing instruction information to the printer to instruct the printer to write the email address generated by the address generating section in the wireless tag.

6. A printer which performs printing based on an email transmitted from a user terminal, the printer comprising:
   a wireless tag which records information indicative of an email address temporarily assigned to the printer in advance and transmits the email address to the user terminal by means of wireless communication, the email address being generated with information on a period of validity of the email address by a server that receives a request for generating the email address, together with the period of validity of the email address, the period of the validity of the email address being set individually for each user as the generating of the email address is requested;
   a printing controller which executes printing based on printing data corresponding to an email transmitted from the user terminal to the server with the email address being set as the destination, the printing data being generated by the server based on the email and the printing data being transmitted from the server to the printer; and
   a rewriting section which deletes or rewrites the email address recorded in the wireless tag, based on a rewriting instruction information with regard to the email address recorded in the wireless tag, the rewriting instruction information being transmitted from the server.

7. A printing method comprising:
   receiving a request for generating an email address, together with a period of validity of the email address, the period of the validity of the email address being set individually for each user as the generating of the email address is requested;
   generating the email address, which is temporarily assigned to a printer, and information on the period of validity;
   acquiring an email address using a user terminal by means of wireless communication from a wireless tag which is provided in a printer and which records information which indicates the email address which is temporarily assigned to the printer in advance;

setting the email address which is acquired as the destination of the email using the user terminal;
transmitting the email where the email address is set as the destination using the user terminal to a server;
generating printing data in the server based on the email received from the user terminal;
transmitting the printing data from the server to the printer;
executing printing using the printer based on the printing data; and
transmitting rewriting instruction information with regard to the email address which is recorded in the wireless tag from the server to the printer; and
deleting or rewriting the email address which is recorded in the wireless tag based on the rewriting instruction information which is transmitted from the server.

* * * * *